(12) United States Patent
Sekii et al.

(10) Patent No.: US 9,964,687 B2
(45) Date of Patent: May 8, 2018

(54) LUMINAIRE

(71) Applicant: PANASONIC INTELLECTUAL PROPERTY MANAGEMENT CO., LTD., Osaka (JP)

(72) Inventors: Hiroyuki Sekii, Osaka (JP); Kyohei Nakamura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/432,362

(22) Filed: Feb. 14, 2017

(65) Prior Publication Data

US 2017/0234509 A1    Aug. 17, 2017

(30) Foreign Application Priority Data

Feb. 17, 2016    (JP) .................................. 2016-028037

(51) Int. Cl.
*F21V 8/00*    (2006.01)
*F21S 8/04*    (2006.01)
(Continued)

(52) U.S. Cl.
CPC .............. *G02B 6/0055* (2013.01); *F21S 8/04* (2013.01); *F21V 23/001* (2013.01); *G02B 6/004* (2013.01);
(Continued)

(58) Field of Classification Search
CPC .... G02B 6/0055; G02B 6/0038; G02B 6/004; G02B 6/0068; G02B 6/0073; G02B 6/0078; G02B 6/0088; G02B 6/0035; G02B 6/0036; G02B 6/0041; G02B 6/0043; G02B 6/0011; F21S 8/04; F21V 23/001;
(Continued)

(56) References Cited

U.S. PATENT DOCUMENTS 6,633,722 B1 *   10/2003   Kohara ................ G02B 6/0061
                                            385/146
2002/0044233 A1 *  4/2002   Ohkawa ............... G02B 6/0036
                                            349/65
(Continued)

FOREIGN PATENT DOCUMENTS

JP        5-107542      4/1993
JP        2005-251566   9/2005
(Continued)

*Primary Examiner* — Bao Q Truong
(74) *Attorney, Agent, or Firm* — Greenblum & Bernstein, P.L.C.

(57) ABSTRACT

A luminaire is provided. A main surface of a light-guiding panel included in the luminaire includes a reflecting area having a plurality of approximately conical recesses. An angle θ formed by a lateral surface of each of the recesses and the main surface of the light-guiding panel satisfies a condition defined by a distance D from a center position of a light source to a center position of the reflecting area, a distance H from an illumination target surface to the center position of the light source, an angle γ which the light-guiding panel forms with a horizontal plane, a refractive index n of the light-guiding panel, and a surface roughness $R_a$ of the lateral surface of each of the recesses.

20 Claims, 7 Drawing Sheets

(51) Int. Cl.
*F21V 23/00* (2015.01)
*F21Y 115/10* (2016.01)

(52) U.S. Cl.
CPC ......... *G02B 6/0038* (2013.01); *G02B 6/0068* (2013.01); *G02B 6/0073* (2013.01); *G02B 6/0078* (2013.01); *G02B 6/0088* (2013.01); *F21Y 2115/10* (2016.08)

(58) Field of Classification Search
CPC ............. F21V 2200/20; F21V 2200/00; F21Y 2115/10; G02F 1/133615
See application file for complete search history.

(56) References Cited

U.S. PATENT DOCUMENTS

| | | | | |
|---|---|---|---|---|
| 2004/0076010 | A1* | 4/2004 | Kuo | G02B 6/0021 362/332 |
| 2005/0196123 | A1 | 9/2005 | Kumagai | |
| 2009/0190070 | A1 | 7/2009 | Nagata et al. | |
| 2015/0138829 | A1* | 5/2015 | Jang | G02B 6/0016 362/606 |

FOREIGN PATENT DOCUMENTS

| | | |
|---|---|---|
| JP | 2011-28996 | 2/2011 |
| JP | 2012-185970 | 9/2012 |
| WO | 2008/013146 | 1/2008 |

\* cited by examiner

LUMINAIRE

CROSS REFERENCE TO RELATED APPLICATION

This application claims the benefit of priority of Japanese Patent Application Number 2016-028037 filed on Feb. 17, 2016, the entire content of which is hereby incorporated by reference.

BACKGROUND

1. Technical Field

The present disclosure relates to luminaires using a light-guiding panel.

2. Description of the Related Art

In recent years, light-emitting diode (LED) luminaires using an LED light source are becoming popular. For example, Japanese Unexamined Patent Application Publication No. 2012-185970 (Patent Literature 1) discloses a luminaire light source using an LED module and a light guide (light-guiding panel).

SUMMARY

In the case where a luminaire using a light-guiding panel is to be used inside a room where work is being done, there are cases where a luminaire capable of intensively brightening the area where the work is being done is desired over a luminaire capable of uniformly brightening the entire room.

In view of this, the present disclosure provides a luminaire capable of improving brightness directly below the luminaire.

A luminaire according to an aspect of the present disclosure is a luminaire that emits light toward an illumination target, the luminaire including: a light source; a luminaire body which houses the light source; and a light-guiding panel including a main surface facing opposite the illumination target and an end portion held by the luminaire body, the end portion having an end surface into which light emitted by the light source enters, wherein the main surface of the light-guiding panel includes a reflecting area having a plurality of recesses for reflecting the light entering from the end surface toward the illumination target, each of the plurality of recesses having a conical shape, and an angle $\theta$ formed by a lateral surface of each of the plurality of recesses and the main surface of the light-guiding panel satisfies an expression of $\theta'-\Delta\theta<\theta<\theta'+\Delta\theta$, when an angle $\theta'$ and an angle $\Delta\theta$ are defined as in subsequently-described Equation 8 and Equation 13, where D denotes a distance, in millimeters, from a center position of the light source to a center position of the reflecting area in a horizontal direction, H denotes a distance, in millimeters, from the illumination target to the center position of the light source, γ denotes an angle which the light-guiding panel forms with a horizontal plane, n denotes a refractive index of the light-guiding panel, R denotes a surface roughness, in micrometers, of the lateral surface of each of the plurality of recesses, and $\theta$, $\theta'$, $\Delta\theta$, and γ denote angles in degrees.

A luminaire according to an aspect of the present disclosure is a luminaire that emits light toward an illumination target, the luminaire including: a light source; a luminaire body which houses the light source; and a light-guiding panel including a main surface facing opposite the illumination target and an end portion held by the luminaire body, the end portion having an end surface into which light emitted by the light source enters, wherein the main surface of the light-guiding panel includes a reflecting area having a plurality of recesses for reflecting the light entering from the end surface toward the illumination target, each of the plurality of recesses having a conical shape, and an angle $\theta$ formed by a lateral surface of each of the plurality of recesses and the main surface of the light-guiding panel satisfies an expression of $\theta'-\Delta\theta<\theta<\theta'+\Delta\theta$, when an angle $\theta'$ and an angle $\Delta\theta$ are defined as in subsequently-described Equation 14 and Equation 15, where D denotes a distance, in millimeters, from a center position of the light source to a center position of the reflecting area in a horizontal direction, H denotes a distance, in millimeters, from the illumination target to the center position of the light source, γ denotes an angle which the light-guiding panel forms with a horizontal plane, n denotes a refractive index of the light-guiding panel, and $\theta$, $\theta'$, $\Delta\theta$, and γ denote angles in degrees.

A luminaire according to the present disclosure is capable of improving brightness directly below the luminaire.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, specific description of embodiments will be carried out with reference to the drawings. It should be noted that the embodiments described below represent a generic or specific example. The numerical values, shapes, materials, structural components, etc. shown in the following embodiments are mere examples, and are not intended to limit the scope of the present disclosure. Furthermore, among the structural components in the following embodiments, components not recited in any one of the independent claims which indicate the broadest concepts of the present invention are described as arbitrary structural components.

Furthermore, the respective figures are schematic diagrams and are not necessarily precise illustrations. Furthermore, in the respective figures, substantially identical components are assigned the same reference signs, and overlapping description may be omitted or simplified.

It should be noted that, in the subsequent embodiments, a luminaire that is implemented as a ceiling light will be described. In the drawings in the subsequent embodiments, the Z-axis direction is, for example, the vertical direction, and there are cases where the positive side in the Z-axis is described as the top side or ceiling side. Furthermore, there are instances where the negative side in the Z-axis is described as the bottom side or the light exit side. Furthermore, the X-axis direction and the Y-axis direction are mutually orthogonal directions in a plane (horizontal plane) perpendicular to the Z-axis. Furthermore, in the subsequent embodiments, "plan view" means viewing from the vertical direction (Z-axis direction). More specifically, plan view means viewing from a direction perpendicular to a ceiling surface, a floor surface, a main surface of light-guiding panels, or the horizontal plane, etc.

Embodiment

[Overall Configuration]

Figure 1:
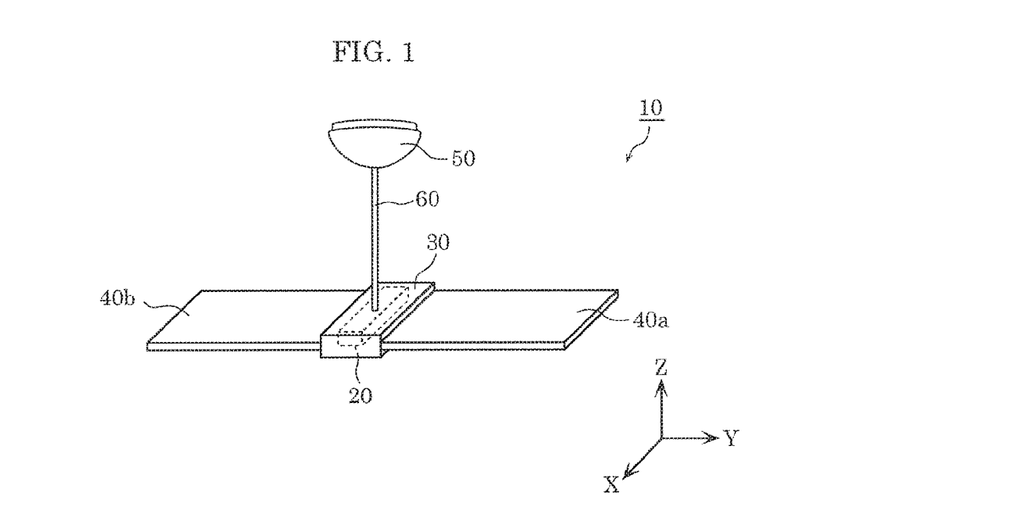
FIG. 1 is a perspective view of a luminaire according to an embodiment.
Figure 2:
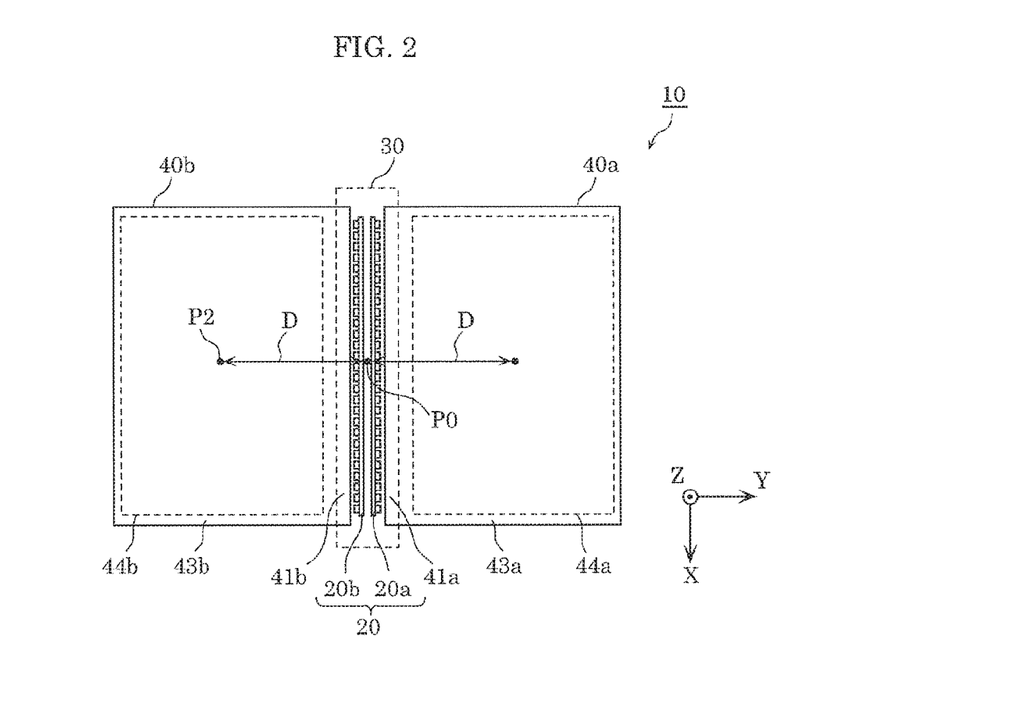
FIG. 2 is a plan view of the luminaire according to the embodiment.
Figure 3:
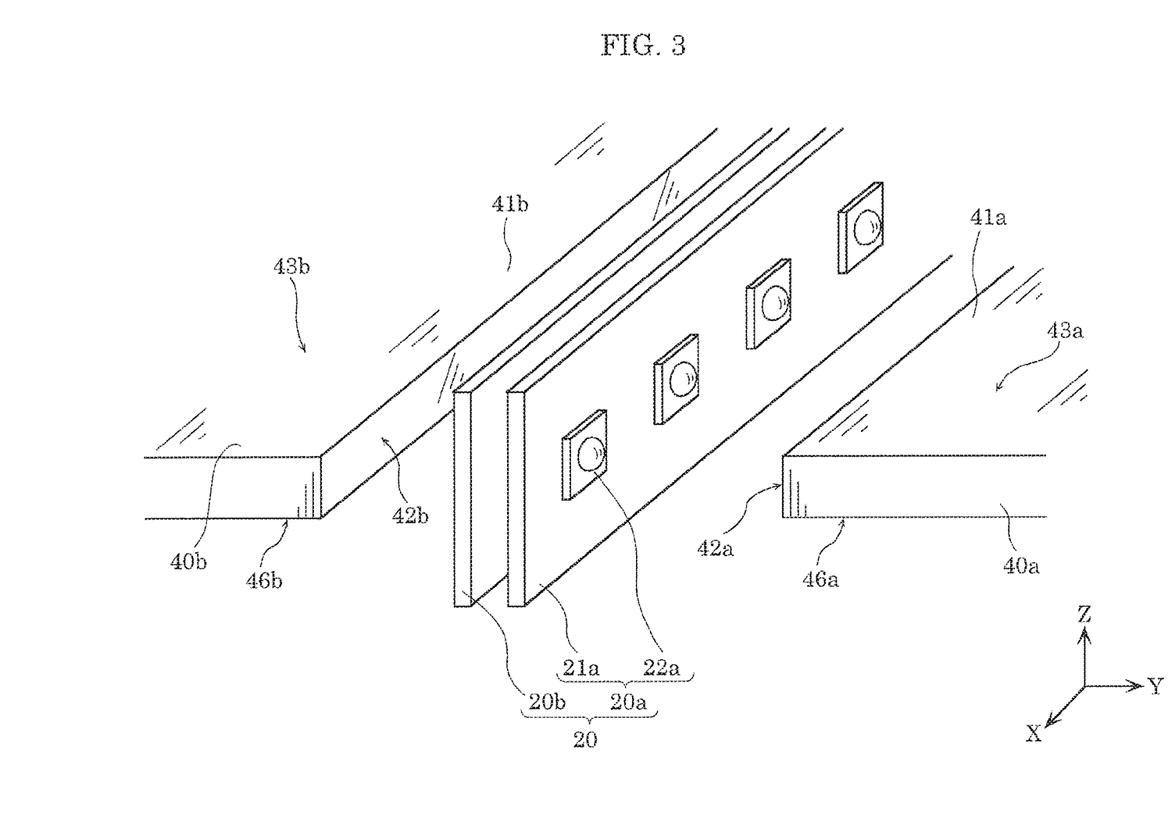
FIG. 3 is a diagram illustrating an arrangement of light-emitting modules and light-guiding panels.

First, the configuration of a luminaire according to an embodiment will be described in detail. FIG. 1 is a perspective view of a luminaire according to the embodiment. FIG. 2 is a plan view of the luminaire according to the embodiment. FIG. 3 is a diagram illustrating an arrangement of light-emitting modules and light-guiding panels.

As illustrated in FIG. 1 to FIG. 3, luminaire 10 includes light source 20 (light-emitting module 20a and light-emitting module 20b), luminaire body 30, light-guiding panel 40a and light-guiding panel 40b, power receptor 50, and power receiving cable 60. It should be noted that, in FIG. 2 and FIG. 3, illustration of luminaire body 30 is omitted (depicted using a broken line in FIG. 2) The same is true for power receptor 50 and power receiving cable 60.

Luminaire 10 is a ceiling light that is to be attached to a ceiling and mainly illuminates downward. Specifically, luminaire 10 is an edge light luminaire that emits light toward an illumination target located lower than the ceiling. Specifically, the illumination target is a floor surface or a desk top surface, etc. Hereinafter, the respective structural components of luminaire will be described in detail.

[Light Source]

Light source 20 includes light-emitting module 20a and light-emitting module 20b, and functions as a light source of luminaire 20. In this embodiment, light source 20 includes the two of light-emitting module 20a and light-emitting module 20b which correspond 1-to-1 with light-guiding panel 40a and light-guiding panel 40b. However, light source 20 may irradiate light to both of light-guiding panel 40a and light-guiding panel 40b using a single light-emitting module. Center position P0 of light source 20 and distance D illustrated in FIG. 2 will be described later.

As illustrated in FIG. 2 and FIG. 3, light-emitting module 20a and light-emitting module 20b included in light source 20 are housed back-to-back inside luminaire body 30, and emit light toward the side (Y-axis direction) of luminaire body 30. It should be noted that, since light-emitting module 20a and light-emitting module 20b have the same configuration, only light-emitting module 20 is described in detail below.

Light-emitting module 20a includes board 21a and a plurality of light-emitting elements 22a.

Board 21a is a rectangular board that is elongated in the X-axis direction in the figure. The longitudinal direction of board 21a is the X-axis direction, and the transverse direction of board 21a is the Z-axis direction (height direction). Board 21a is disposed approximately parallel to end surface 42a included in end portion 41a of light-guiding panel 40a. It should be noted that the shape of board 21a is not particularly limited.

Specifically, board 21a is a rigid board such as a resin board, a ceramic board, or a metal-based board, etc. It should be noted that board 21a may be a film board. Specifically, board 21a may be a board having an insulating layer formed using FR4 (glass fiber), or a board having an insulating layer formed using polyimide, or a board having an insulating layer formed using polyethylene, etc.

Among the surfaces of board 21a, the mounting surface, which is a main surface on which the plurality of light-emitting elements 22a are mounted, is disposed opposite end surface 42a of light-guiding panel 40a. The plurality of light-emitting elements 22a are disposed lined up in a row along the longitudinal direction of board 21a.

Light-emitting elements 22a are surface mount device (SMD) LED elements which emit white light. A surface mount device LED element is a packaged LED element in which an LED chip is mounted inside a resin-molded cavity, and a phosphor-containing resin is filled into the cavity. Light-emitting elements 22a emit light of a color between, for example, daylight color and light-bulb color (color temperature of at least 2,600 K and at most 7,100 K), toward end surface 42a of light-guiding panel 40a located further on the positive side of the Y-axis than light elements 22a are.

It should be noted that light-emitting module 20a and light-emitting module 20b are electrically connected to a power supply circuit inside luminaire body 30 by a cable (not illustrated), and emit light using power supplied from the power supply circuit.

[Luminaire Body]

Luminaire body 30 is a case that is to be attached to a ceiling via power receptor 50 and power receiving cable 60, and houses light-emitting module 20a and light-emitting module 20b. Furthermore, luminaire body 30 also functions as a holding component which holds end portion 41a of light-guiding panel 40a and end portion 41b of light-guiding panel 40b, and end surface 42a of light-guiding panel 40a and end surface 42b of light-guiding panel 40b are disposed inside luminaire body 30.

Luminaire body 30 is a component having an approximately rectangular parallelepiped shape. Luminaire body 30 also houses the power supply circuit (not illustrated) which converts alternating current power supplied from a commercial power system via power receptor 50 and power receiving cable 60 into direct current power for causing light-emitting module 20a and light-emitting module 20b to emit light.

Power receptor 50 is to be attached to a hooking ceiling body provided in the ceiling. By attaching power receptor 50 to the hooking ceiling body, the power supply circuit can receive supply of alternating current power from the commercial power system via power receiving cable 60.

Luminaire 30 such as that described above is formed using, for example, aluminum, but may be formed using a metal other than aluminum such as iron, etc. Furthermore, luminaire body 30 may be formed using a resin material such as PBT, etc.

[Light-Guiding Panels]

Light-guiding panel 40a and light-guiding panel 40b are approximately rectangular board-shaped optical components. Light-guiding panel 40a and light-guiding panel 40b are disposed aligned in the Y-axis direction so as to sandwich luminaire body 30 (light source 20) in a plan view. Light-guiding panel 40a and light-guiding panel 40b may be disposed parallel to a horizontal plane (XY plane), or may be tilted with respect to the horizontal plane.

Although light-guiding panel 40a and light-guiding panel 40b are transparent components, light-transmissive components are sufficient. Light-guiding panel 40a and light-guiding panel 40b are formed using acrylic for example, but may be formed using a polycarbonate or glass. The thickness of light-guiding panel 40a and light-guiding panel 40b is approximately at least 5 mm and at most 10 mm, for example.

Light-guiding panel 40a includes main surface 43a (surface on the positive side of the Z-axis) which faces the ceiling, and end portion 41a (end portion on the negative side of the Y-axis) which is held by luminaire body 30. The light emitted by light-emitting module 20a (light source 20) enters end surface 42a included in end portion 41a. Stated differently, light-guiding panel 40a is held by luminaire body 30 in a state where main surface 43a faces the ceiling, and end surface 42a is located opposite light-emitting module 20a.

Reflecting area 44a (reflecting structure), on which conical minute recesses are provided, is formed in main surface 43a. Here, conical means approximately conical, and approximately conical means being substantially conical including manufacturing unevenness, etc. The depth of the recesses is approximately 0.2 mm, for example. As illustrated in FIG. 2, reflecting area 44a is formed across almost the entirety of main surface 43a of light-guiding panel 40a, with the exception of the portion (end portion 41a) hidden by luminaire body 30. Reflecting area 44a reflects mainly downward the light from light-emitting module 20a that has entered end surface 42a. With this, light-guiding panel 40a performs surface emission.

Among the end surfaces of light-guiding panel 40a, end surface 42a is the end surface located opposite light-emitting module 20a (end surface on the negative side of the Y-axis). End surface 42a is a flat surface that functions as an entry surface of light to light-guiding panel 40a. Bottom surface 46a (surface on the negative side of the Z-axis) is a main surface on the backside of main surface 43a, and is a flat surface that functions as an exit surface of light from light-guiding panel 40a.

Light-guiding panel 40b has main surface 43b (surface on the positive side of the Z-axis) which faces the ceiling, and end portion 41b (end portion on the negative side of the Y-axis) which is held by luminaire body 30. The light emitted by light-emitting module 20b (light source 20) is incident on end surface 42b included in end portion 41b. Stated differently, light-guiding panel 40b is held by luminaire body 30 in a state where main surface 43b faces the ceiling, and end surface 42b is located opposite light-emitting module 20b.

Reflecting area 44b (reflecting structure), on which approximately conical minute recesses are provided, is formed in main surface 43b. The depth of the recesses is approximately 0.2 mm, for example. As illustrated in FIG. 2, reflecting area 44b is formed across almost the entirety of main surface 43b of light-guiding panel 40b, with the exception of the portion (end portion 41b) hidden by luminaire body 30. Reflecting area 44b reflects mainly downward the light from light-emitting module 20b that has entered end surface 42b. With this, light-guiding panel 40b performs surface emission.

Among the end surfaces of light-guiding panel 40b, end surface 42b is the end surface located opposite light-emitting module 20b (end surface in the positive side of the Y-axis). End surface 42b is a flat surface that functions as an entry surface for light entering light-guiding panel 40a. Bottom surface 46b (surface on the negative side of the Z-axis) is a main surface on the backside of main surface 43b, and is a flat surface that functions as an exit surface of light from light-guiding panel 40b.

[Surface Roughness of Recesses]

As described above, recesses are provided on each of main surface 43a of light-guiding panel 40a and main surface 43b of light-guiding panel 40b. Here, when surface roughness $R_a$ of the lateral surface of the recesses is at least 0 and less than 10 µm, there are cases where the light-guide panels do not perform surface light-emission uniformly, and uneven brightness and uneven illumination occur. It should be noted that the occurrence of uneven brightness increases as surface roughness RI decreases.

The inventors found that, by intentionally increasing surface roughness $R_a$ of the lateral surface of the recesses to at least 10 µm (for example, at least µm and at most 20 µm), the above-described uneven brightness and uneven illumination can be reduced. It should be noted that surface roughness $R_a$ refers to what is called arithmetic average roughness, and is expressed in [µm] units.

Figure 4:
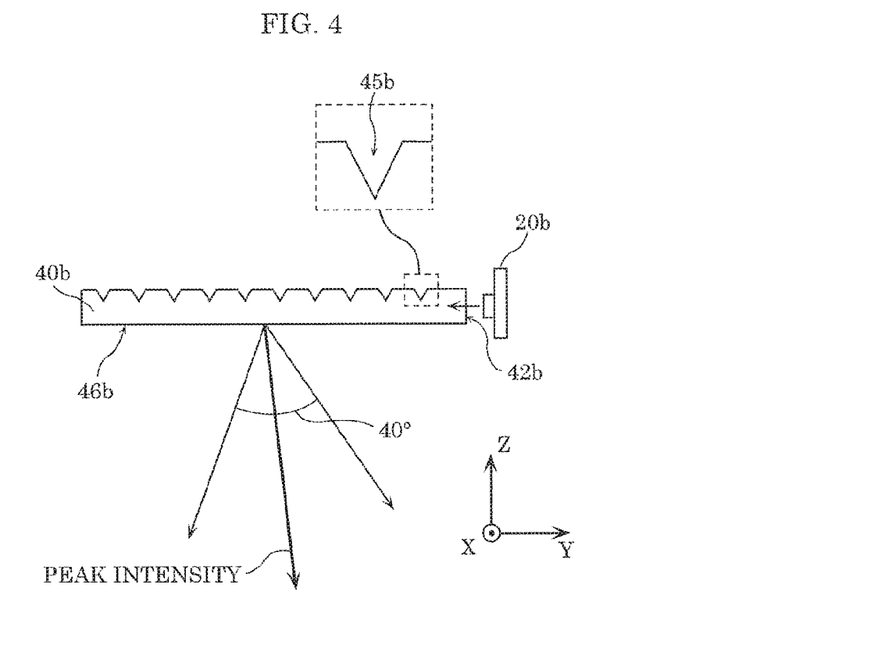
FIG. 4 is a first schematic diagram for describing the relationship between surface roughness of lateral surfaces of recesses and exiting light from a light-guiding panel.
Figure 5:
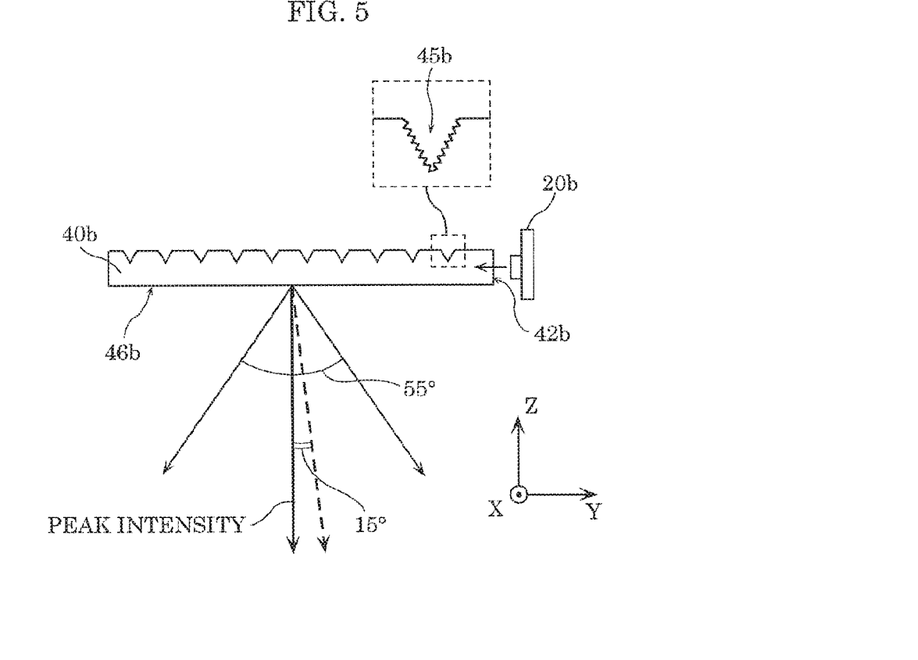
FIG. 5 is a second schematic diagram for describing the relationship between surface roughness of lateral surfaces of recesses and exiting light from a light-guiding panel.

Furthermore, the inventors further found that there is a relation between the surface roughness of the lateral surface of the recesses and exiting light from the light-guiding panels. FIG. 4 and FIG. 5 are schematic diagrams for describing the relationship between the surface roughness of the lateral surfaces of the recesses and the exiting light from a light-guiding panel. It should be noted that in this embodiment, description will be carried out mainly regarding light-guiding panel 40b, and description of light-guiding panel 40a will be omitted as appropriate since light-guiding panel 40a is identical to light-guiding panel 40b.

In FIG. 4, surface roughness $R_a$ of the lateral surface of recess 45b provided in main surface 43b of light-guiding panel 40b is 0 (at most 1 µm and approximately 0). In contrast, in FIG. 5, surface roughness R of the lateral surface of recess 45b is 15 µm. It should be noted that, in either of the cases in FIG. 4 and FIG. 5, the light emitted by light-guiding panel 40b enters end surface 42b perpendicularly.

As illustrated in FIG. 4 and FIG. 5, when surface roughness of the lateral surface of recess 45b is 15 µm, the peak intensity position of the exiting light shifts 15 degrees. In this written description, such an angle is defined as peak shift angle θp [°].

Furthermore, when the surface roughness of recess 45b is approximately 0, spread angle Δθs (full width at half maximum, half width) [°] of the exiting light is 40°. However, when the surface roughness of recess 45b is approximately 15 µm, spread angle Δθs of the exiting light widens to 55°.

Figure 6:
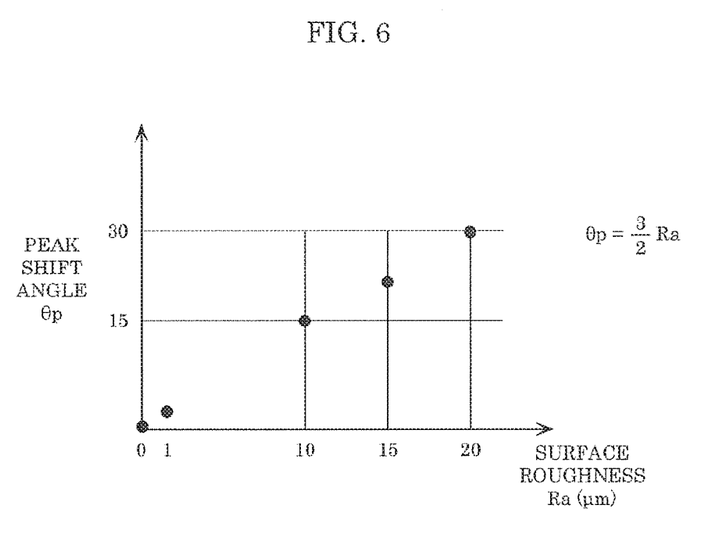
FIG. 6 is a graph illustrating dependence of peak shift angle $\theta p$ to surface roughness $R_a$.
Figure 7:
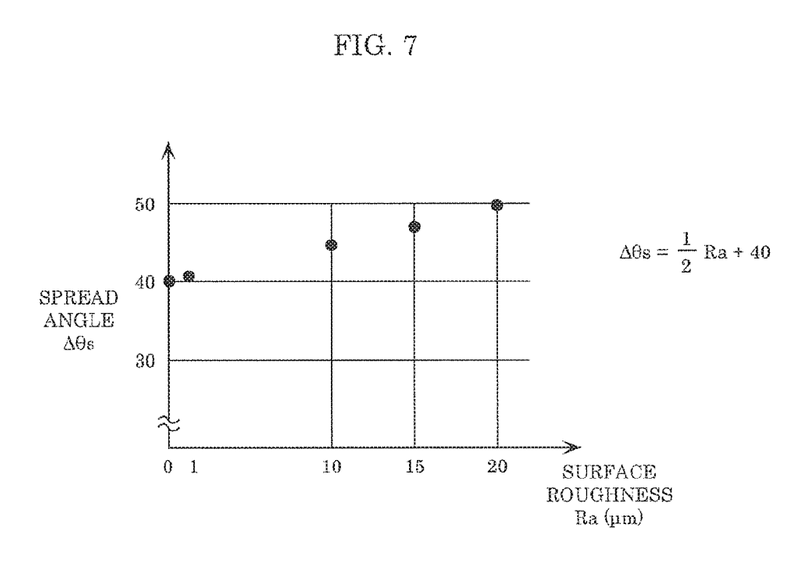
FIG. 7 is a graph illustrating dependence of spread angle $\Delta\theta s$ to surface roughness $R_a$.

In this manner, by changing surface roughness R of recess 45b, and measuring peak shift angle θp and spread angle Δθs, the inventors found that peak shift angle θp and spread angle Δθs are dependent on surface roughness $R_a$. FIG. 6 is a graph illustrating the dependence of peak shift angle θp on surface roughness $R_a$. FIG. 7 is a graph illustrating the dependence of spread angle Δθs on surface roughness $R_a$.

As illustrated in FIG. 6, peak shift angle θp is represented by Equation 1 below, using surface roughness $R_a$.

[Math. 1]

$$\theta_p = \frac{3}{2} R_a \quad \text{(Equation 1)}$$

Furthermore, as illustrated in FIG. 7, spread angle $\Delta\theta_s$ is represented by Equation 2 below, using surface roughness $R_a$.

[Math. 2]

$$\Delta\theta_s = \frac{1}{2} R_a + 40 \quad \text{(Equation 2)}$$

[Recess: Detailed Configuration 1]

A ceiling light which is not recessed in the ceiling but is attached externally, is typically designed to illuminate the entire room uniformly. However, there are cases where a luminaire capable of intensively lighting just part of the entire area is desired.

Figure 8:
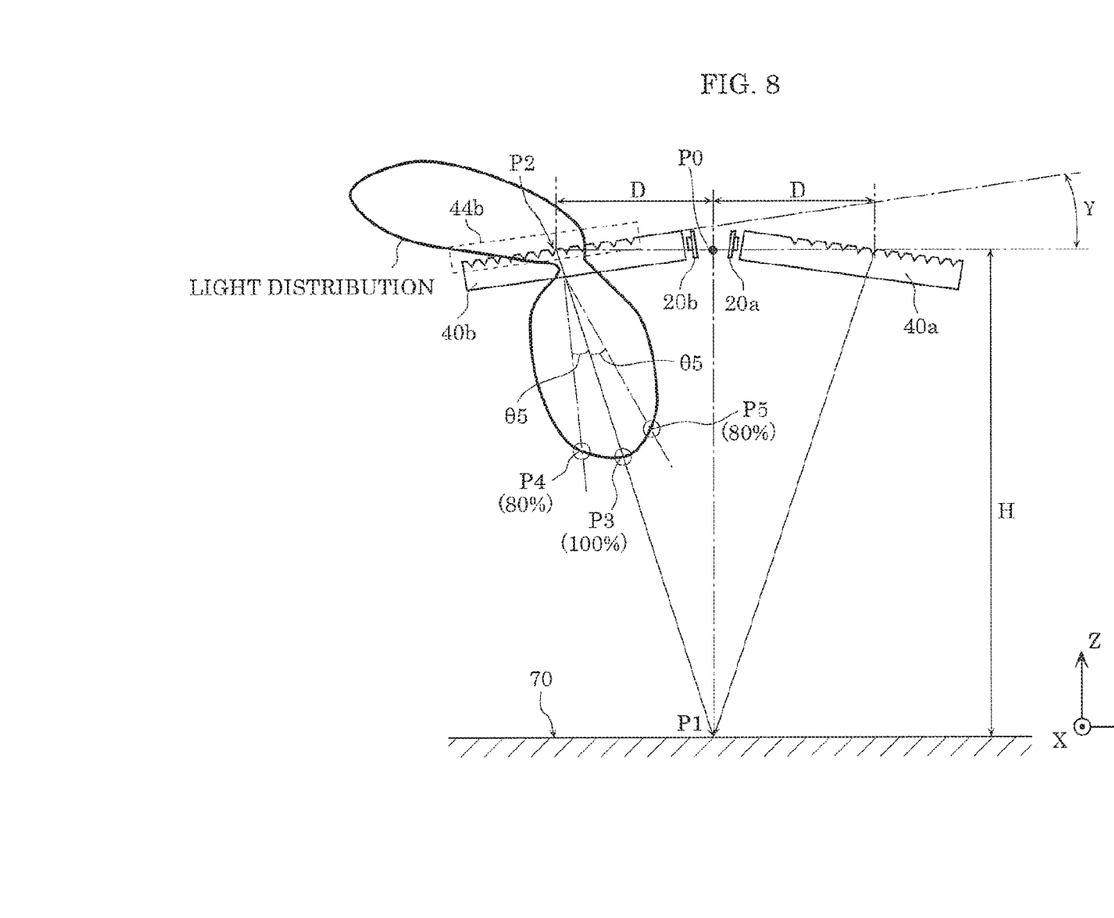
FIG. 8 is a general view for describing a configuration of a recess.
Figure 9:
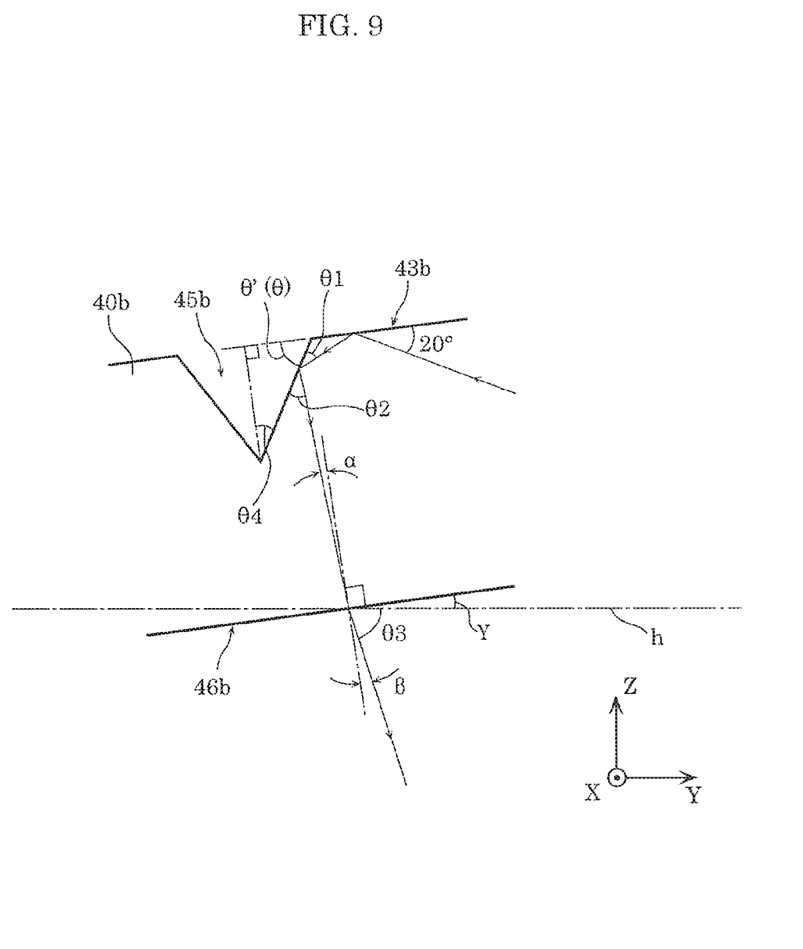
FIG. 9 is an enlarged view of the inside of a light-guiding panel for describing a configuration of a recess.

In view of this, the inventors have found, based on the above-described knowledge, a configuration (structure) for recess 45b capable of improving the brightness (illuminance) directly below luminaire 10. The configuration of such recess 45b will be described below with reference to the drawing. FIG. 8 is a general view for describing the configuration of recess 45b. FIG. 9 is an enlarged view of the inside of light-guiding panel 40b for describing the configuration of recess 45b. It should be noted that the configuration of recess 45b described below can also be applied to the recesses provided in reflecting area 44a of light-guiding panel 40a.

Illumination target surface 70 illustrated in FIG. 8 is an example of an illumination target of luminaire 10, and is specifically a floor surface or a desk top surface, etc. In order to maximize the illuminance directly below luminaire 10, light should be reflected so that majority of the light striking recess 45b located at center position P2 of reflecting area 44b of light-guiding panel 40b travels toward position P1 of illumination target surface 70, which is directly below luminaire 10 (light source 20, luminaire body 30). Angle θ' (illustrated in FIG. 9) formed between the lateral surface of recess 45b and main surface 43b of light-guiding panel 40b and which satisfies the above-described condition will be described.

First, distance D and distance H illustrated in FIG. 8 will be described. Distance D is the distance, in millimeters, from center position P0 of light source 20 in the horizontal direction (plan view) to center position P2 of reflecting area 44b.

Center position P0 of light source 20 is, for example, located at the middle of the width of light source 20 in the X-axis direction and the middle of the width of light source 20 in the Y-axis direction. Furthermore, center position P0 is also the center of the width of light source 20 in the Z-axis direction. In this embodiment, center position P0 of light source 20 coincides with the center position of luminaire 10 and the center position of luminaire body 30. In other words, distance D is the distance from the center position of luminaire 10 (or the center position of luminaire body 30) in the horizontal direction to center position P2 of reflecting area 44b.

Furthermore, center position P2 of reflecting area 44b is located at the middle of the width of reflecting area 44b in the X-axis direction and the middle of the width of reflecting area 44b in the Y-axis direction.

It should be noted that it is possible to have a case where light-guiding panel 40b is not rectangular. In such a case, it is sufficient to set, as center position P2 of reflecting area 44b, the position at the middle of a virtual line that is perpendicular to the mounting surface of light-emitting module 20b and has a start point at the end of reflecting area 44b that is close to light-emitting module 20b and an end point at the end of reflecting area 44b that is far from light-emitting module 20b.

Distance H [mm] is the distance from illumination target surface (position P1) to center position P0. It should be noted that, if the thickness of light-guiding panel 40b and the tilt of light-guiding panel 40b with respect to the horizontal plane can be considered sufficiently small compared to distance H, distance H may be the distance from illumination target surface 70 to light-guiding panel 40b. In the example in FIG. 8 and FIG. 9, light-guiding panel 40b is disposed tilted γ [°] with respect to the horizontal plane. It should be noted that γ may be 0.

Next, angle θ' will be described in detail. When the light from light-emitting module 20b enters end surface 42b of light-guiding panel 40b perpendicularly, it is known empirically and by experimentation that, as illustrated in FIG. 9, the greatest amount of light is incident on main surface 43b in front of recess 45b located at center position P2, at an angle of 20°. In other words, it is understood that the frequency of light incident on main surface 43b in front of recess 45b located at center position P2 at an angle of 20° is highest.

It should be noted that, of the light that enters surface 42b of light-guiding panel 40b, the light that is not reflected by main surface 43b and is directly incident on the lateral surface of recess 45b is refracted and emitted toward the ceiling. Such light becomes leaked light. Furthermore, since other recesses 45b are present closer to light-emitting module 20b than recess 45b located at center position P2 is, light having a small incidence angle (angle formed by the beam of light and main surface 43b) is obstructed by the other recesses 45b and does not reach main surface 43b in front of recess 45b located at center position P2. Furthermore, when light-guiding panel 40b is formed using acrylic, light is not incident on main surface 43b at an angle greater than or equal to 42°.

Light reaching main surface 43b is reflected, and the light reflected by main surface 43b is incident on the lateral surface of recess 45b. Where incidence angle (angle formed by the beam of light and the lateral surface of recess 45b) at this time is denoted as θ1, θ1 is calculated as θ1=θ'−20°. The light incident on the lateral surface of recess 45b is reflected. The exit angle (angle formed by the beam of light and the lateral surface of recess 45b) at this time is defined as θ2.

Although θ2=θ1 is satisfied when the surface roughness of the lateral surface of recess 45b is approximately 0, according to the above-described knowledge light exiting from light-guiding panel 40b shifts by peak shift angle θp. When consideration is given to the fact that refractive index n (n>1) of light-guiding panel 40b, and incidence angle α and exit angle β described later are not big, it is acceptable to assume that the shift of peak shift angle θp of exiting light from light-guiding panel 40b is equivalent to the shift θp×(1/n) inside light-guiding panel 40b. As described above, since peak shift angle θp can be represented as in Equation 1, θ2 can be represented by Equation 3.

[Math. 3]

$$\theta_2 = \theta_1 - \frac{1}{n}\theta_p = \theta' - 20 - \frac{3}{2n}R_a \quad \text{(Equation 3)}$$

On the other hand, light incident on the lateral surface of recess 45b is emitted from bottom surface 46b of light-guiding panel 40b. At this time, Equation 4 below, which is the relational expression between incidence angle α and exit angle β, can be obtained according to Snell's law.

[Math. 4]

$$\sin \beta = n \sin \alpha \quad \text{(Equation 4)}$$

Angle θ3 formed by the light exiting from bottom surface 46b and straight line h indicating the horizontal plane is calculated as θ3=90°−(β+γ).

Here, in order for the light exiting from bottom surface 46b to travel toward position P1, it necessary to satisfy Equation 5 below. When Equation 5 is solved for β, Equation 6 below can be obtained.

[Math. 5]

$$\tan\theta_3 = \tan\{90 - (\beta + \gamma)\} = \frac{H}{D} \quad \text{(Equation 5)}$$

[Math. 6]

$$\beta = \tan^{-1}\left(\frac{D}{H}\right) - \gamma \quad \text{(Equation 6)}$$

Angle θ4 formed by a virtual line indicating the depth of recess 45b and the lateral surface of recess 45b is calculated as θ4=90°−θ'. Here, since the aforementioned virtual line and a virtual line (virtual line for defining incidence angle α and exit angle β) perpendicular to bottom surface 46b are parallel, θ4+α=θ2 is satisfied. Based on the fact that θ2 can be represented using Equation 3, when this relational expression is solved for θ', θ' can be represented using Equation 7 below.

[Math. 7]

$$\theta' = \frac{1}{2}\left(\alpha + 110 + \frac{3}{2n}R_a\right) \quad \text{(Equation 7)}$$

When α is eliminated using Equation 4 and Equation 7, θ' can be represented using Equation 8 below. It should be noted that β is represented using Equation 6.

[Math. 8]

$$\theta' = \frac{1}{2}\left\{\sin^{-1}\left(\frac{\sin\beta}{n}\right) + 110 + \frac{3}{2n}R_a\right\} \text{ with} \quad \text{(Equation 8)}$$

$$\beta = \tan^{-1}\left(\frac{D}{H}\right) - \gamma$$

An example is given below for a specific value of θ'. Where D=150 [mm], H=2000 [mm], γ=10 [°], n=1.49, and $R_a$=110 [μm], θ'=58.2 [°].

[Recess: Detailed Configuration 2]

If angle θ formed by the lateral surface of recess 45b and main surface 43b of light-guiding panel 40b and θ' become equal, the illuminance at position P1 is, mathematically, at its highest. However, obtaining an illuminance that is approximately 80% of such illuminance is considered sufficient for the brightness directly below luminaire 10. Here, the range of θ for which such a high illuminance is obtainable is assumed to be θ'−Δθ<θ<θ'+Δθ, and Δθ will be described in detail using FIG. 8.

Generally, the light distribution of a luminaire can be made to approximate a power of the cosine function, and the light distribution of luminaire 10 can also be made to approximate a power of the cosine function. Specifically, light distribution (intensity ratio) L(x) of light emitted from light-guiding panel 40b can be made to approximate a power of the cosine function as in Equation 9. However, in view of Equation 2 above, d in Equation 9 can be represented as in Equation 10.

[Math. 9]

$$L(x) = \{\cos(x - \theta_p)\}^d \quad \text{(Equation 9)}$$

[Math. 10]

$$d = -\frac{\log 2}{\log(\cos\Delta\theta_s)} = -\frac{\log 2}{\log\left\{\cos\left(\frac{1}{2}R_a + 40\right)\right\}} \quad \text{(Equation 10)}$$

For example, assuming that x=θp in Equation 9, the intensity of light at position P3 in FIG. 8 can be calculated. In contrast, by assuming x=θp±θ5 in Equation 9, it is possible to calculate shift angle θ5 corresponding to position P4 and position P5 which are positions at which the intensity of light becomes 80% (4/5) of that at position P3. In other words, Equation 11 below related to shift angle θ5 can be obtained. When this equation is solved for θ5, Equation 12 below can be obtained.

[Math. 11]

$$\frac{4}{5} = (\cos\theta_5)^d \quad \text{(Equation 11)}$$

[Math. 12]

$$\theta_5 = \cos^{-1}\left\{\left(\frac{4}{5}\right)^{\frac{1}{d}}\right\} \quad \text{(Equation 12)}$$

Even if the light emitted from light-guiding panel 40b shifts by as much as shift angle θ5, illuminance that is approximately 80% of peak illuminance can be obtained at position P1. Here, when consideration is given to the fact that refractive index n (n>1) of light-guiding panel 40b, and incidence angle α and exit angle β are not big, it is acceptable to assume that the shift of θ5 of exiting light from light-guiding panel 40b is equivalent to the shift θ5×(1/n) inside light-guiding panel 40b. In other words, Δθ, which is the amount of shift of θ, can be deemed to be Δθ=θ5×(1/n). Therefore, Δθ can be represented using Equation 13 below.

[Math. 13]

$$\Delta\theta = \frac{1}{n}\cos^{-1}\left\{\left(\frac{4}{5}\right)^{\frac{1}{d}}\right\} \text{ with}$$ (Equation 13)

$$d = -\frac{\log 2}{\log\left\{\cos\left(\frac{1}{2}R_a + 40\right)\right\}}$$

An example is given below for a specific value of $\Delta\theta$. Where D=150 [mm], H=2000 [mm], $\gamma$=10 [°], n=1.49, and $R_a$=110 [μm], $\Delta\theta$=7.60 [°].

[Light-Guiding Panel Fabrication Method]

A method for fabricating light-guiding panel 40a and light-guiding panel 40b such as those described above will be described below.

First, approximately conical recessions are formed on the main surface of a master light-guiding panel by cutting using a diamond bit, etc. Specifically, reflecting area 44b is formed on the main surface of a master light-guiding panel. The depth of the recesses is, for example, approximately 0.2 mm.

Next, processing such as sandblasting is performed in order to roughen the lateral surface of the recesses. It should be noted that, by performing cutting using a diamond bit having a roughened edge surface, the aforementioned processing by sandblasting, etc. may be omitted.

Next, a mold (stamper) is fabricated using the master light-guiding panel fabricated in the above-described manner. By injection molding using the fabricated mold, the molded items, that is, light-guiding panel 40a and light-guiding panel 40b are fabricated.

[Modification]

In the case where uneven brightness, etc. does not occur in light-guiding panel 40b, and in the case where the uneven brightness occurring in light-guiding panel 40b is allowable, surface roughness $R_a$ of the lateral surface of recess 45b may be small. As described above, when surface roughness $R_a$ of the lateral surface of recess 45b is small, spread angle $\Delta\theta_s$ becomes small, and thus brightness directly below luminaire 10 can be intensively increased further.

For example, when surface roughness $R_a$ of the lateral surface of recess 45b is a small value of at least 0 μm and at most 1 μm, $\theta'$ can be calculated by assuming $R_a$=0 in Equation 8. Specifically, $\theta'$ at this time can be represented using Equation 14 below.

[Math. 14]

$$\theta' = \frac{1}{2}\left\{\sin^{-1}\left(\frac{\sin\beta}{n}\right) + 110\right\} \text{ with } \beta = \tan^{-1}\left(\frac{D}{H}\right) - \gamma$$ (Equation 14)

For example, where D=150 [mm], H=2000 [mm], $\gamma$=10 [°], n=1.49, and $R_a$=110 [μm], $\theta'$=53.09 [°].

Furthermore, $\Delta\theta$ when surface roughness $R_a$ of the lateral surface of recess 45b is a small value of at most 1 μm may be calculated by assuming $R_a$=0 in Equation 13. Specifically, $\Delta\theta$ at this time can be represented using Equation 15 below.

[Math. 15]

$$\Delta\theta = \frac{1}{n}\cos^{-1}\left\{\left(\frac{4}{5}\right)^{\frac{1}{d}}\right\} \text{ with } d = -\frac{\log 2}{\log(\cos 40)}$$ (Equation 15)

For example, where D=150 [mm], H=2000 [mm], $\gamma$=10 [°], n=1.49, and $R_a$=110 [μm], $\Delta\theta$=10.87 [°].

[Advantageous Effects, Etc.]

As described above, luminaire 10 is a luminaire that emits light toward illumination target surface 70. Illumination target surface 70 is an example of an illumination target.

Luminaire 10 includes light source 20, luminaire body 30 which houses light source 20, and light-guiding panel 40b including main surface 43b facing opposite illumination target 70 and end portion 41b which is held by luminaire body 30, end portion 41b having end surface 42b into which light emitted by light source 20 enters. Main surface 43b of light-guiding panel 40b includes reflecting area 44b having conical recesses 45b for reflecting the light entering from end surface 42b toward illumination target surface 70.

Angle $\theta$ formed by a lateral surface of each of recesses 45 and main surface 43b of light-guiding panel 40b satisfies an expression of $\theta'-\Delta\theta<\theta<\theta'+\Delta\theta$, when an angle $\theta'$ and an angle $\Delta\theta$ are defined as in Equation 8 and Equation 13, where D denotes a distance, in millimeters, from center position P0 of light source 20 to center position P2 of reflecting area 44b in a horizontal direction, H denotes a distance, in millimeters, from illumination target surface 70 to center position P2 of light source 20, $\gamma$ denotes an angle which light-guiding panel 40b forms with a horizontal plane, n denotes a refractive index of light-guiding panel 40b, $R_a$ denotes a surface roughness, in micrometers, of the lateral surface of each of recesses 45, and $\theta$, $\theta'$, $\Delta\theta$, and $\gamma$ denote angles in degrees.

Accordingly, luminaire 10 can improve the brightness (illuminance) at illumination target surface 70 (position P1) directly below luminaire 10.

Furthermore, angle $\theta$ formed by a lateral surface of each of recesses 45 of luminaire 10 and main surface 43b of light-guiding panel 40b satisfies an expression of $\theta'-\Delta\theta<\theta<\theta'+\Delta\theta$, when an angle $\theta'$ and an angle $\Delta\theta$ are defined as in Equation 14 and Equation 15.

Accordingly, luminaire 10 can improve the brightness (illuminance) at illumination target surface 70 (position P1) directly below luminaire 10.

Furthermore, luminaire 10 may include a plurality of light-guiding panels. For example, luminaire 10 may include the two light-guiding panels of light-guiding panel 40a and light-guiding panel 40b. The two light-guiding panels are, for example, disposed so that luminaire body 30 is located between the two light-guiding panels in a plan view.

Accordingly, luminaire 10 can improve the brightness at illumination target surface 70 (position P1) directly below luminaire 10, using the plurality of light-guiding panels.

Other Embodiments

Although the luminaire according to the foregoing embodiment has been described thus far, the present disclosure is not limited to the foregoing embodiment.

Figure 10:
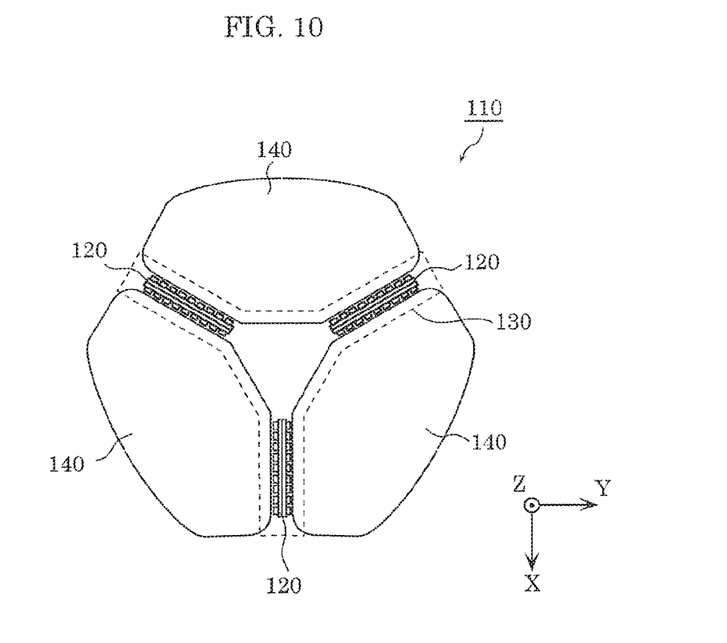
FIG. 10 is a plan view of a luminaire including three light-guiding panels.
Figure 11:
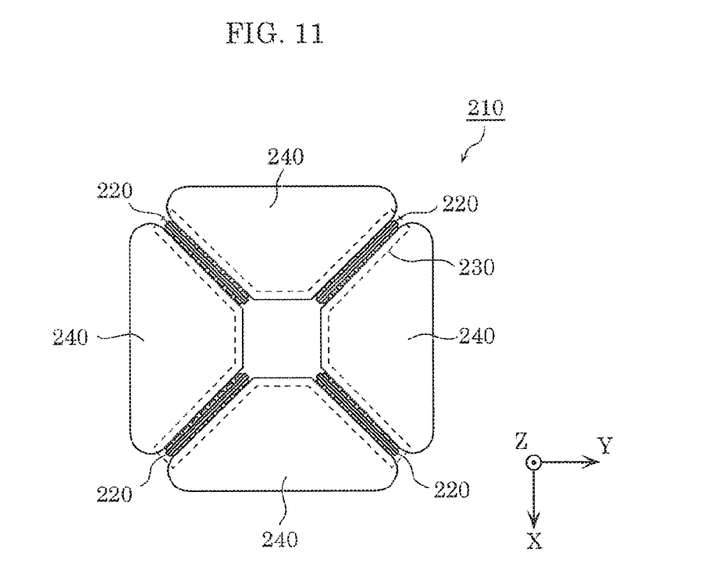
FIG. 11 is a plan view of a luminaire including four light-guiding panels.

For example, there is no particular limitation on the number of light-guiding panels included in the luminaire and the plan view shape of the light-guiding panels. It is sufficient for the luminaire to have at least one light-guiding panel, and three or more light-guiding panels may be included. FIG. 10 is a plan view (schematic diagram) of a luminaire including three light-guiding panels. FIG. 11 is a plan view (schematic diagram) of a luminaire including four light-guiding panels.

Luminaire 110 illustrated in FIG. 10 includes three light-guiding panels 140 disposed side-by-side in the circumferential direction. Stated differently, the three light-guiding panels are disposed in a radial pattern in a plan view. The plan view shape of each light-guiding panel 140 is approximately hexagonal (modified hexagon having rounded corners). Light source 120 is disposed between one light-guiding panel 140 and another light-guiding panel 140 in the circumferential direction. Each light source 120 is disposed extending in the radial direction, and emits light toward the end surfaces of the two light-guiding panels 140 that sandwich light source 120. Luminaire 110 includes three light-guiding panels 120, and three light sources 120 are housed in luminaire body 130 (illustrated using broken lines).

Luminaire 210 illustrated in FIG. 11 includes four light-guiding panels 240 disposed side-by-side in the circumferential direction. Stated differently, the four light-guiding panels are disposed in a radial pattern in a plan view. The plan view shape of each light-guiding panel 240 is approximately trapezoidal (modified trapezoid). Light source 220 is disposed between one light-guiding panel 240 and another light-guiding panel 240 in the circumferential direction. Each light source 220 is disposed extending in the radial direction, and emits light toward the end surfaces of the two light-guiding panels 240 that sandwich light source 220. Luminaire 210 includes four light-guiding panels 220, and four light sources 220 are housed in luminaire body 230 (illustrated using broken lines).

As in luminaire 110 and luminaire 210, the luminaire may include three or more light-guiding panels. Furthermore, the plurality of light-guiding panels may be disposed in a radial pattern in a plan view.

Accordingly, a luminaire including three or more light-guiding panels disposed in a radial pattern in a plan view can improve brightness directly below the luminaire. It should be noted that, in luminaire 110 and luminaire 210, the light sources may be disposed in the central portion of the luminaire body (central portion of the entire luminaire in a plan view).

Furthermore, in the foregoing embodiment, the luminaire is implemented as what is called a pendant light. However, the luminaire according to the present disclosure may be implemented as another luminaire, such as a luminaire that is to be attached to a hooking ceiling body (ceiling) using an adapter for a flat columnar luminaire.

Furthermore, although what are called SMD light-emitting modules are used for the light sources in the foregoing embodiment, there is no particular limitation on the form of the light sources. For example, chip-on-board (COB) light-emitting modules may be used for the light sources. Furthermore, solid-state light-emitting elements other than LEDs, such as organic electroluminescent elements (OLED) or inorganic electroluminescent elements, may be used.

Furthermore, the present disclosure may be realized as a luminaire (light-guiding panel) fabricating method, or a luminaire designing method.

Although a luminaire according to one or more aspects has been described based on the foregoing embodiments, the present disclosure is not limited to these embodiments. Forms obtained by various modifications to the exemplary embodiments that can be conceived by a person of skill in the art as well as forms realized by combining structural components in different exemplary embodiments, which are within the scope of the essence of the present disclosure may be included in the one or more aspects.

What is claimed is:

1. A luminaire that emits light toward an illumination target, the luminaire comprising:
    a light source;
    a luminaire body which houses the light source; and
    a light-guiding panel including a main surface facing opposite the illumination target and an end portion held by the luminaire body, the end portion having an end surface into which light emitted by the light source enters,
    wherein the main surface of the light-guiding panel includes a reflecting area having a plurality of recesses for reflecting the light entering from the end surface toward the illumination target, each of the plurality of recesses having an approximately conical shape, and
    an angle $\theta$ formed by a lateral surface of each of the plurality of recesses and the main surface of the light-guiding panel satisfies an expression of $\theta'-\Delta\theta<\theta<\theta'+\Delta\theta$, when an angle $\theta'$ and an angle $\Delta\theta$ are defined as:

$$\theta' = \frac{1}{2}\left\{\sin^{-1}\left(\frac{\sin\beta}{n}\right) + 110 + \frac{3}{2n}R_a\right\} \text{ with } \beta = \tan^{-1}\left(\frac{D}{H}\right) - \gamma;$$

and $$\Delta\theta = \frac{1}{n}\cos^{-1}\left\{\left(\frac{4}{5}\right)^{\frac{1}{d}}\right\} \text{ with } d = -\frac{\log 2}{\log\left\{\cos\left(\frac{1}{2}R_a + 40\right)\right\}},$$

where
    D denotes a distance, in millimeters, from a center position of the light source to a center position of the reflecting area in a horizontal direction,
    H denotes a distance, in millimeters, from the illumination target to the center position of the light source,
    $\gamma$ denotes an angle which the light-guiding panel forms with a horizontal plane,
    n denotes a refractive index of the light-guiding panel,
    $R_a$ denotes a surface roughness, in micrometers, of the lateral surface of each of the plurality of recesses, and
    $\theta$, $\theta'$, $\Delta\theta$, and $\gamma$ denote angles in degrees.

2. The luminaire according to claim 1,
    wherein the light-guiding panel includes a plurality of light-guiding panels.

3. The luminaire according to claim 2,
    wherein the light-guiding panel includes two light-guiding panels, and
    the two light-guiding panels are disposed so that the luminaire body is located between the two light-guiding panels in a plan view.

4. The luminaire according to claim 3,
    wherein the two light-guiding panels have a same configuration.

5. The luminaire according to claim 3,
    wherein the light source includes two light-emitting modules housed back-to-back,
    each of the two light-emitting modules includes a board and a plurality of light-emitting elements, the plurality of light-emitting elements being lined up in a row along a longitudinal direction of the board, and
    the board of each of the two light-emitting modules is disposed parallel to the end surface of one of the two light-guiding panels.

6. The luminaire according to claim 5,
wherein the plurality of light-emitting elements are surface-mount-device light emitting diodes.

7. The luminaire according to claim 3,
wherein the luminaire body has a rectangular parallelepiped shape, and
the two light-guiding panels each have a rectangular board shape.

8. The luminaire according to claim 1,
wherein the angle γ is 0°.

9. The luminaire according to claim 3,
wherein the two light-guiding panels are tilted with respect to the horizontal plane.

10. The luminaire according to claim 2,
wherein the light-guiding panel includes at least three light-guiding panels, and
the plurality of light-guiding panels are disposed in a radial pattern about the luminaire body in a plan view.

11. The luminaire according to claim 1,
wherein the luminaire is configured to be attached to a ceiling, the illumination target being lower than the ceiling, and
the main surface of the light-guiding panel faces the ceiling.

12. The luminaire according to claim 1,
wherein a thickness of the light-guiding panel is at least 5 mm and at most 10 mm,
a depth of each of the plurality of recesses is 0.2 mm, and
the surface roughness of the lateral surface of each of the plurality of recesses is at least 10 μm and at most 20 μm.

13. The luminaire according to claim 2,
wherein the plurality of light-guiding panels each have a non-rectangular shape, and
the center position of the reflecting area is a position at a middle of a virtual line that is perpendicular to the light source and has a start point at an end of the reflecting area that is closest to the light source and an end point at an end of the reflecting area that is farthest from the light source.

14. A luminaire that emits light toward an illumination target, the luminaire comprising:
a light source;
a luminaire body which houses the light source; and
a light-guiding panel including a main surface facing opposite the illumination target and an end portion held by the luminaire body, the end portion having an end surface into which light emitted by the light source enters,
wherein the main surface of the light-guiding panel includes a reflecting area having a plurality of recesses for reflecting the light entering from the end surface toward the illumination target, each of the plurality of recesses having an approximately conical shape, and
an angle θ formed by a lateral surface of each of the plurality of recesses and the main surface of the light-guiding panel satisfies an expression of θ'−Δθ<θ<θ'+Δθ, when an angle θ' and an angle Δθ are defined as:

$$\theta' = \frac{1}{2}\left\{\sin^{-1}\left(\frac{\sin\beta}{n}\right) + 110\right\} \text{ with } \beta = \tan^{-1}\left(\frac{D}{H}\right) - \gamma;$$

and $$\Delta\theta = \frac{1}{n}\cos^{-1}\left\{\left(\frac{4}{5}\right)^{\frac{1}{d}}\right\} \text{ with } d = -\frac{\log 2}{\log(\cos 40)},$$

where
D denotes a distance, in millimeters, from a center position of the light source to a center position of the reflecting area in a horizontal direction,
H denotes a distance, in millimeters, from the illumination target to the center position of the light source,
γ denotes an angle which the light-guiding panel forms with a horizontal plane,
n denotes a refractive index of the light-guiding panel, and
θ, θ', Δθ, and γ denote angles in degrees.

15. The luminaire according to claim 14,
wherein the light-guiding panel includes a plurality of light-guiding panels.

16. The luminaire according to claim 15,
wherein the light-guiding panel includes two light-guiding panels, and
the two light-guiding panels are disposed so that the luminaire body is located between the two light-guiding panels in a plan view.

17. The luminaire according to claim 16,
wherein the two light-guiding panels have a same configuration.

18. The luminaire according to claim 16,
wherein the light source includes two light-emitting modules housed back-to-back,
each of the two light-emitting modules includes a board and a plurality of light-emitting elements, the plurality of light-emitting elements being lined up in a row along a longitudinal direction of the board, and
the board of each of the two light-emitting modules is disposed parallel to the end surface of one of the two light-guiding panels.

19. The luminaire according to claim 15,
wherein the light-guiding panel includes at least three light-guiding panels, and
the plurality of light-guiding panels are disposed in a radial pattern about the luminaire body, in a plan view.

20. The luminaire according to claim 14,
wherein the luminaire is configured to be attached to a ceiling, the illumination target being lower than the ceiling, and
the main surface of the light-guiding panel faces the ceiling.

* * * * *